United States Patent [19]
Kinoshita

[11] Patent Number: 5,222,410
[45] Date of Patent: Jun. 29, 1993

[54] STEERING COLUMN ASSEMBLY

[75] Inventor: Satoshi Kinoshita, Shizuoka, Japan

[73] Assignee: Fuji Kiko Co., Ltd., Japan

[21] Appl. No.: 826,511

[22] Filed: Jan. 27, 1992

[30] Foreign Application Priority Data

| Jan. 31, 1991 | [JP] | Japan | 3-002800[U] |
| Jan. 31, 1991 | [JP] | Japan | 3-002801[U] |
| Jan. 31, 1991 | [JP] | Japan | 3-002802[U] |
| Jan. 31, 1991 | [JP] | Japan | 3-010668 |

[51] Int. Cl.$^5$ .......................... B62D 1/18; G05G 1/00
[52] U.S. Cl. ...................................... 74/493; 74/541;
188/371; 248/300; 280/775
[58] Field of Search ................. 74/493, 533, 534, 540,
74/541; 188/371; 248/300; 280/775, 777

[56] References Cited

U.S. PATENT DOCUMENTS

| 1,319,630 | 10/1919 | Sloop | 74/533 X |
| 3,355,962 | 12/1967 | Gerdes et al. | 74/493 |
| 4,357,050 | 11/1982 | Fisher, III | 74/541 X |
| 4,607,540 | 8/1986 | Kinoshita et al. | 74/493 |
| 4,915,412 | 4/1990 | Yuzuriha et al. | 74/493 X |
| 4,938,093 | 7/1990 | Matsumoto et al. | 74/493 |
| 5,029,489 | 7/1991 | Burmeister et al. | 74/493 |
| 5,052,240 | 10/1991 | Miyshi et al. | 74/493 |

FOREIGN PATENT DOCUMENTS

| 405949 | 1/1991 | European Pat. Off. | 74/493 |
| 56-16581 | 2/1981 | Japan . | |
| 57-53730 | 11/1982 | Japan . | |
| 64-83455 | 3/1989 | Japan . | |
| 1-123969 | 8/1989 | Japan . | |
| 2-92779 | 4/1990 | Japan . | |
| 2-34145 | 9/1990 | Japan . | |
| 2116496 | 9/1983 | United Kingdom | 74/493 |

Primary Examiner—Allan D. Herrmann
Assistant Examiner—David W. Laub
Attorney, Agent, or Firm—Ronald P. Kananen

[57] ABSTRACT

In a tilt steering column assembly, there is provided a tilt lock mechanism comprising upper and lower toothed bars which extend along the column assembly, and which are formed with rack-like teeth, and pivotally supported by upper and lower steering columns, respectively. The bars are both placed between two side walls of a lock member having inclined cam slots which move the bars into and out of engagement. The toothed bars engaged with each other to lock the tilt steering column assembly securely in a selected tilt position.

30 Claims, 10 Drawing Sheets

STEERING COLUMN ASSEMBLY

BACKGROUND OF THE INVENTION

The present invention relates to a steering column assembly for a vehicle such as a motor vehicle. Especially, the present invention relates to a tilt steering column assembly including a tilt lock mechanism, a tilt spring and a mounting bracket usable for fixing the column assembly to a vehicle body.

The steering column assembly, in general, extends obliquely and upwardly from a steering gear, and has a steering wheel at the top. The tilt steering column assembly permits a driver to move the steering wheel up and down to a desired angular position. The tiltable steering column can improve the safety of a vehicle by providing ergonomic driving comfort. In some models the tilt spring is arranged to cause the steering wheel to rise rapidly up from a preset position to an uppermost position immediately after release of the tilt lock so that a wider space is available for the driver to get on or off the car.

In large sized vehicles such as heavy trucks, a tilt hinge is often placed near the driver's foot position. In passenger cars, however, the tilt hinge is usually placed at a higher level near the driver's hands to leave a comfortable space for the legs and knees of the driver.

There have been proposed various tilt lock (or latch) mechanisms. In one example, a lock device is provided only on one side of a movable bracket (Japanese Utility Model Examined Publication No. 57-53730). Another example is a two-sided type having two locks on left and right sides (Japanese Utility Model Provisional Publication No. 1-123969). This type is advantageous for improving the rigidity of the structure and installing an air bag system. A third example is a center lock type (Japanese Utility Model Examined Publication No. 2-34145) in which the lock mechanism is placed under the steering column near the tilt hinge axis.

The two sided type tilt lock mechanism is complicated in construction, heavy in weight, and unfavorable in manufacturing cost. Besides, it is necessary to maintain the correct positional relationship and synchronism between the left and right sides to avoid incomplete engagement. The conventional center lock type mechanism uses engagement between gear teeth formed in a convex cylindrical surface of a swingable gear member. In this center lock mechanism, however, the gear members must be positioned accurately relative to each other to ensure reliable engagement.

Still another examples of the above type of mechanisms are shown in U.S. Pat. No. 3,355,962; Japanese Patent Provisional Publications Nos. H2-92779, and S64-83455, and Utility Model Provisional Publications Nos. S57-53730 and S56-16581.

SUMMARY OF THE INVENTION

It is an object of the present invention to provide a tilt lock mechanism which is reliable in locking performance and hence safe.

It is another object of the present invention to provide an arrangement for holding a tilt spring in an effective posture.

It is still another object of the present invention to provide a steering column mounting bracket which is easy to fabricate, low in cost, and light in weight.

According to the present invention, a tilt steering column assembly comprises a column subassembly and a tilt lock mechanism. The column subassembly comprises upper and lower steering columns which are connected together so that the upper column is swingable or tiltable about a tilt axis. The lock mechanism comprises first and second toothed members each shaped like a bar. The first toothed member is swingably supported by the upper column, and the second toothed member is swingably supported by the lower column. The first and second toothed members are engaged with each other to lock the swingable upper column securely at a selected angular position.

In a preferred embodiment of the present invention, the bar-shaped tooth members both extends substantially along the axis of the stationary lower steering column, and have teeth which are formed in a substantially flat surface like a rack, and which are spaced one from another substantially along a straight line unlike gear teeth formed in a cylindrical surface. Therefore, almost all of the teeth are engaged simultaneously to provide a strong engaging force.

DETAILED DESCRIPTION OF THE INVENTION

One embodiment of the present invention is shown in FIGS. 1~13.

A tilt steering column assembly of this embodiment includes a mounting bracket (or fixed bracket) 1, a lower steering column 2, a movable bracket 3, a tilt hinge 4, an upper steering column 5, an upper steering shaft 7, a universal joint 6, and a lower steering shaft 8.

Figure 3:
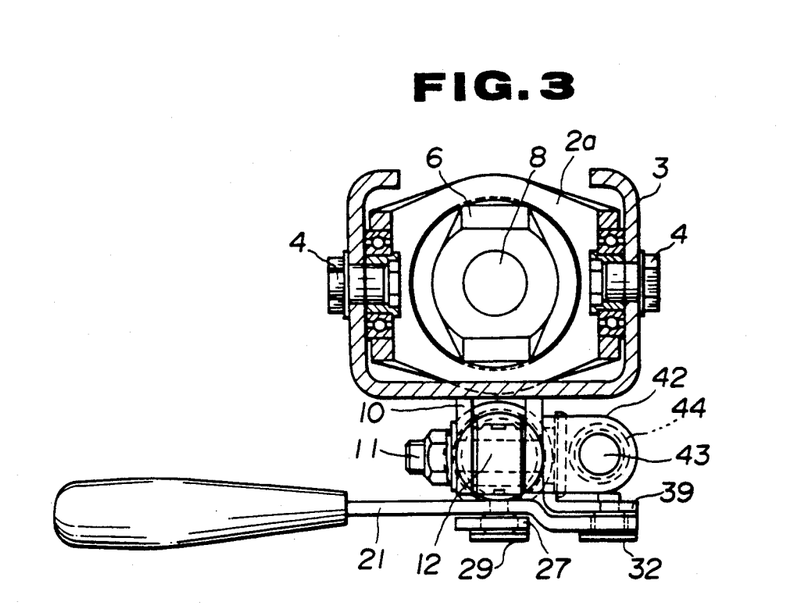
FIG. 3 is a sectional view taken along a line III—III shown in in FIG. 1.

The mounting bracket 1 is adapted to be fixed to a vehicle body of a vehicle such as an automobile. The lower column 2 is supported by the fixed bracket 1. A hinge bracket 2a is fixed to an upper end of the lower column 2. The tilt hinge 4 serves as a tilt center. The movable bracket 3 is rotatably connected with the hinge bracket 2a of the lower column 2 by the tilt hinge 4. The upper column 5 is fixed to the movable bracket 3. Therefore, the movable bracket 3 and the upper column 5 are swingable about the axis of the tilt hinge 4. The upper steering shaft 7 is received in the upper steering column 5, and the lower steering shaft 8 is received in the lower steering column 2. The upper and lower steering shafts 7 and 8 are connected by the universal joint 6 which permits angular displacement and transmits rotation between both shafts 7 and 8. The column assembly further includes a tilt spring 44 (shown in FIG. 2) and a center lock type tilt lock mechanism 45 which is provided under an upper end portion of the lower column 2 and the movable bracket 3. In this embodiment, the tilt spring 44 is provided in the tilt lock mechanism 45. The tilt spring 44 is arranged to cause the upper column 5 to swing upwardly when the tilt lock mechanism 45 is put in an unlocked state. The tilt hinge of this embodiment has left and right units as shown in FIG. 3.

The tilt lock mechanism 45 includes lower and upper support brackets 9 and 10, and first and second (upper and lower) toothed members (or toothed bars) 12 and 13. The lower support bracket 9 is fixed to an underside of the lower column 2, and the upper support bracket 10 is fixed to an underside of the movable bracket 3. The lower support bracket 9 projects downwardly from the upper end of the lower column 2, and the upper support bracket 10 projects downwardly from the lower end of the upper column 5. The upper support bracket 10 has first and second (right and left) arms each of which is formed with a hole 10a. Each of the toothed members 12 and 13 is shaped like a bar. The first (upper) toothed member 12 has a base end portion which is placed between the first and second arms of the upper support bracket 10, and rotatably supported by a support bolt 11 inserted through the holes 10a of the upper support bracket 10. The lower support bracket 9 has first and second (right and left) arms each of which is formed with a hole 9a. The second (lower) toothed member 13 has a base end portion which is placed between the first and second arms of the lower support bracket 9, and rotatably supported by a support bolt 14 inserted through the holes 9a of the lower support bracket 9. Each of the toothed members 12 and 13 has a toothed portion 12a or 13a. The toothed portions 12a and 13a of the first and second (upper and lower) toothed members 12 and 13 overlap each other. The toothed portion 12a or 13a of each toothed member 12 or 13 has parallel teeth extending along a widthwise direction which is perpendicular to a lengthwise direction of the bar-shaped toothed member 12 or 13. Thus, each toothed member 12 or 13 is in the form of a rack.

The support bolts 11 and 14 are substantially parallel to each other, and substantially perpendicular to an imaginary vertical plane which contains the axis of the lower column 2. The teeth of the upper and lower toothed members 12 and 13 are substantially parallel to the axes of the bolts 11 and 14. The bolt 14 is closer to the lower end of the lower column 2 than the bolt 11 is. In this embodiment, the first toothed member 12 is placed on the second toothed member 13. The teeth of the upper first toothed member 12 are formed in a downwardly facing lower surface which is substantially flat. The teeth of the lower second toothed member 13 are formed in a substantially flat upwardly facing upper surface.

Figure 8:
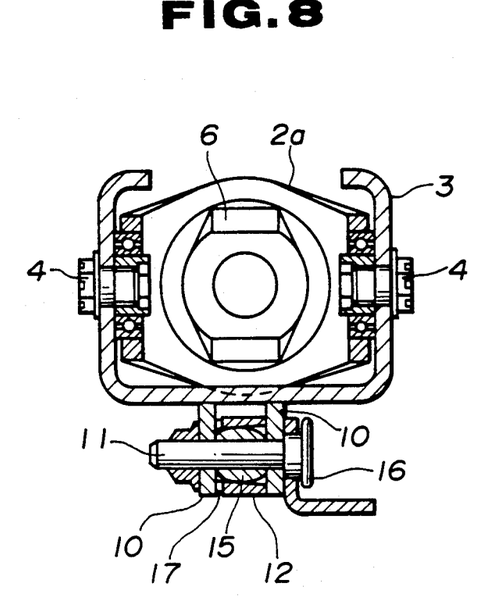
FIG. 8 is a sectional view, taken across a line III—III of FIG. 7, for showing a first support arrangement including a barrel-shaped collar received in a conical hole.
Figure 9:
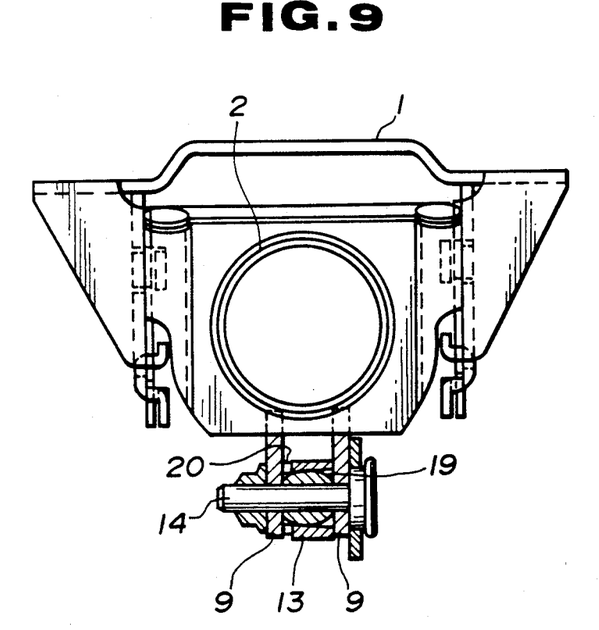
FIG. 9 is a sectional view, taken across a line IV—IV of FIG. 7, for showing a second support arrangement also including a barrel-shaped collar received in a conical hole.
Figure 10:
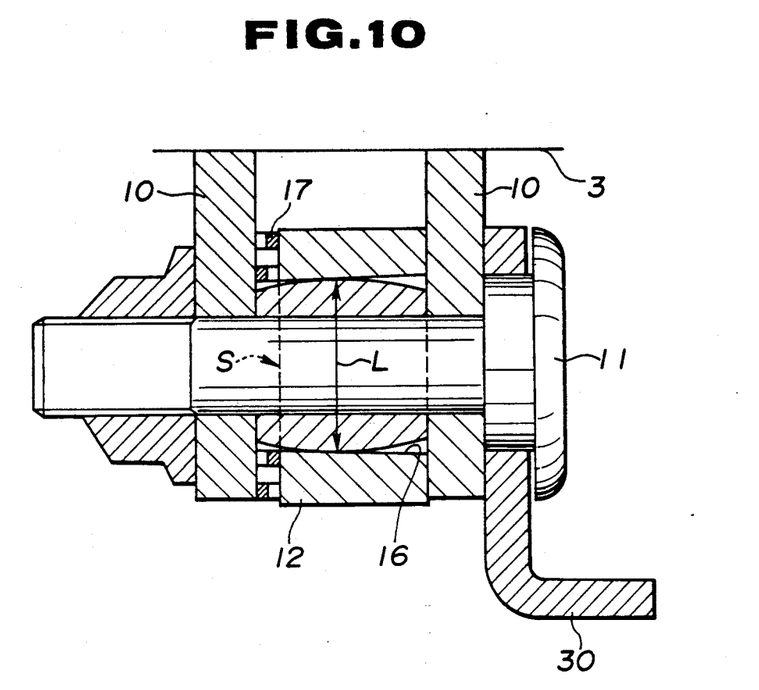
FIG. 10 is an enlarged sectional view showing the first support arrangement of FIG. 8.

The support bolt 11 is inserted, as shown in FIG. 8, through a barrel-shaped collar 15 which is received in a conical hole 16 formed in the base portion of the upper (first) toothed member 12. As shown in FIG. 9, the support bolt 14 is inserted through a barrel-shaped collar 18 which is received in a conical hole 19 formed in the base portion of the lower (second) toothed member 13. Each of the barrel-shaped collars 15 and 18 has a circular cross section. The outside diameter of each barrel-shaped collar 15 and 18 is largest at the middle, and decreases gradually from the middle to each of the left and right ends. As shown in FIG. 10, each barrel-shaped collar has left and right flat circular ends and a curved outside surface generated by rotating an arched line around an axis. The left and right ends of each barrel-shaped collar 15 or 18 are equal in outside diameter. Each barrel-shaped collar 15 or 18 has a center bore extending between the left and right ends. The center bore is circular and straight. The conical hole 16 or 19 of each of the upper and lower toothed members 12 and 13 is shaped like a truncated cone (or a frustum of a right circular cone), and has an inside conical surface facing radially inwardly. Each of the conical holes 16 and 19 has a first circular open end and a second circular open end which is smaller in diameter than the first end. The diameter S of the smaller second open end of the conical hole 16 is smaller than the diameter L of the middle of the barrel-shaped collar 15, as shown in FIG. 10. Therefore, the barrel-shaped collar 15 cannot pass through the second smaller open end of the conical hole 16. The upper toothed member 12 cannot be extracted from the collar 15. Similarly, the diameter of the smaller second end of the conical hole 19 is smaller than the diameter of the middle of the barrel-shaped collar 18, so that the collar 18 cannot pass through the smaller second end of the conical hole 19. The lower toothed member 13 cannot be extracted from the collar 18. There is further provided a biasing means for applying an axial biasing force holding each barrel-shaped collar in the corresponding conical hole. In this embodiment, the biasing means comprises two wave washers. A first wave washer 17 is disposed between the upper support bracket 10 and the base portion of the upper toothed member 12. The wave washer 17 adjoins the smaller second end of the conical hole 16 of the upper toothed member 12, and abuts a wall surface surrounding the second end of the conical hole 16. From the wave washer 17, the upper toothed member 12 receives a pushing force acting in a direction from the smaller second end toward the larger first end of the conical hole 16. Similarly, a second wave washer 20 is disposed between the lower support bracket 9 and the base portion of the lower toothed member 13. The wave washer 20 is also located on the second side on which the smaller second end of the conical hole 19 is located. The waver washer 20 pushes a wall surface of the base portion of the lower toothed member 13 around the second end of the conical hole 19 in a direction from the second end toward the first end of the conical hole 19. It is possible to employ resilient member of various type in place of the wave washers.

The tilt lock mechanism 45 further includes a manual operating lever 21, a lock member (lever) 27 and a guide member (or guide bracket) 30. The lower toothed member 13 has first and second (right and left) sides each of which is formed with a guide groove 22. The grooves 22 extend in the lengthwise direction of the toothed member 13. The upper toothed member 12 has a forward end portion having a hole through which a pin 23 is inserted. The pin 23 extends in the widthwise direction of the upper toothed member 12, and projects outwardly on both sides of the upper toothed member 12 so that the pin 23 serves as outward projections. The lock member 27 has a U-shaped portion 26 having first and second (right and left) side upright walls each of which is formed with an inclined slot 25 and an inward projection 24 which is, in this embodiment, formed by embossing. The upper toothed member 12 is placed between the upright walls of the U-shaped portion 26 of the lock member 27. The pin 23 is received in the inclined slots 25 of the lock member 27. The inward projection 24 extends inwardly from the inside surface of each upright side wall of the U-shaped portion 26. The lower toothed member 13 is placed between the upright side walls of the U-shaped portion 26, and the inward projections 24 are slidably received in the grooves 22 of the lower toothed member 13. The lock member 27 extends from the U-shaped portion 26 to an end portion 28.

The U-shaped portion 26 of the lock member 27 has a flat bottom extending between the lower ends of the first and second upright walls. Each inclined slot 25 slopes down from an upper end 25a to a lower end 25b. The upper end 25a of each inclined slot 25 is remoter from the flat bottom of the U-shaped portion 26 than the lower end 25b. The lower end 25b is closer to the flat bottom of the U-shaped portion 26. On each side, the distance of the upper end 25a of the inclined slot 25 from the groove 22 of the lower toothed member 13 is greater than the distance of the lower end 25a of the inclined slot 25 from the groove 22.

The manual lever 21 has an intermediate portion formed with a hole 21a, a base end portion formed with a hole 21b, and a grip portion. The intermediate portion is intermediate between the grip portion and the base end portion. The end portion 28 of the lock member 27 is pivotally connected with the intermediate portion of the manual lever 21 by a pin 29. In this example, the end portion 28 of the lock member 27 is formed with an U-shaped recess. The pin 29 is inserted through the hole 21a of the manual lever 21, and fixed to the intermediate portion of the manual lever 21. The pin 29 is engaged in the U-shaped recess of the end portion 28 of the lock member 27. The guide member 30 has a lever support portion 39 which is formed with a hole 31. A pin 32 is inserted through the hole 21b of the manual lever 21 and the hole 31 of the guide member 30. Thus, the base end portion of the operating lever 21 is pivotally supported by the support portion 39 of the guide member 30. The manual operating lever 21 is swingable about the pin 32. Each of the upright side walls of the U-shaped portion 26 of the lock member 27 is formed with a spring seat portion 34 in the form of an outward flange. A lock spring 33 is disposed under compression between the U-shaped portion 26 of the lock member 27 and the upper toothed member 12 through a spring seat 35 and the seat portions 34 of the lock member 27.

The guide member (bracket) 30 is in the form of a plate held substantially vertically, and extends substantially along the axis of the lower column 2. The guide member 30 has a circular hole 36, an elongated hole 37 and a rectangular hole 38 which is located between the circular hole 36 and the elongated hole 37. The guide member 30 has first and second end portions, and extends from the first end portion to the second end portion. The elongated hole 37 is formed in the first end portion of the guide member 30. The lever support portion 39 is formed in the second end portion of the guide member 30. The second end portion of the guide member 30 is further formed with a spring receiving portion 43. The circular hole 36 is formed between the rectangular hole 38 and the second end portion of the guide member 30. Each of the lever support portion 39 and the spring receiving portion 42 is formed by bending an integral part of the guide member 30 which is in the form of a plate. The lever support portion 39 and the spring receiving portion 42 are both flat and perpendicular to each other.

Figure 4:
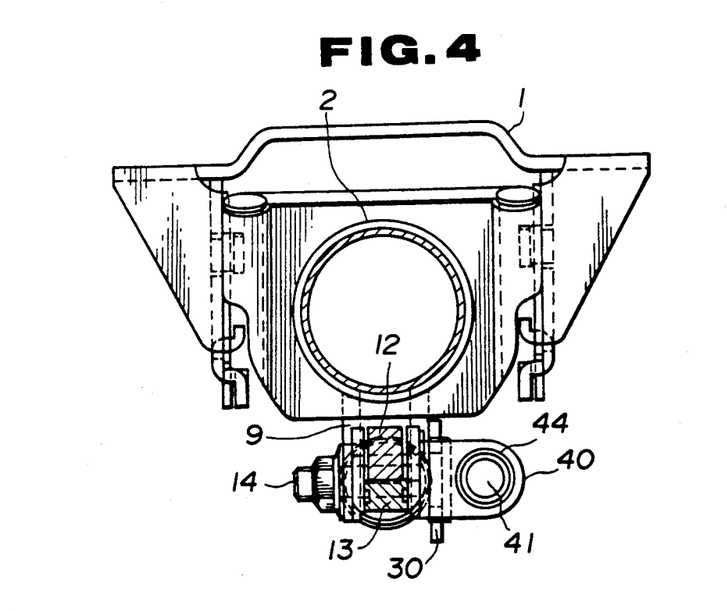
FIG. 4 is a sectional view taken along a line IV—IV shown in FIG. 1.
Figure 5:
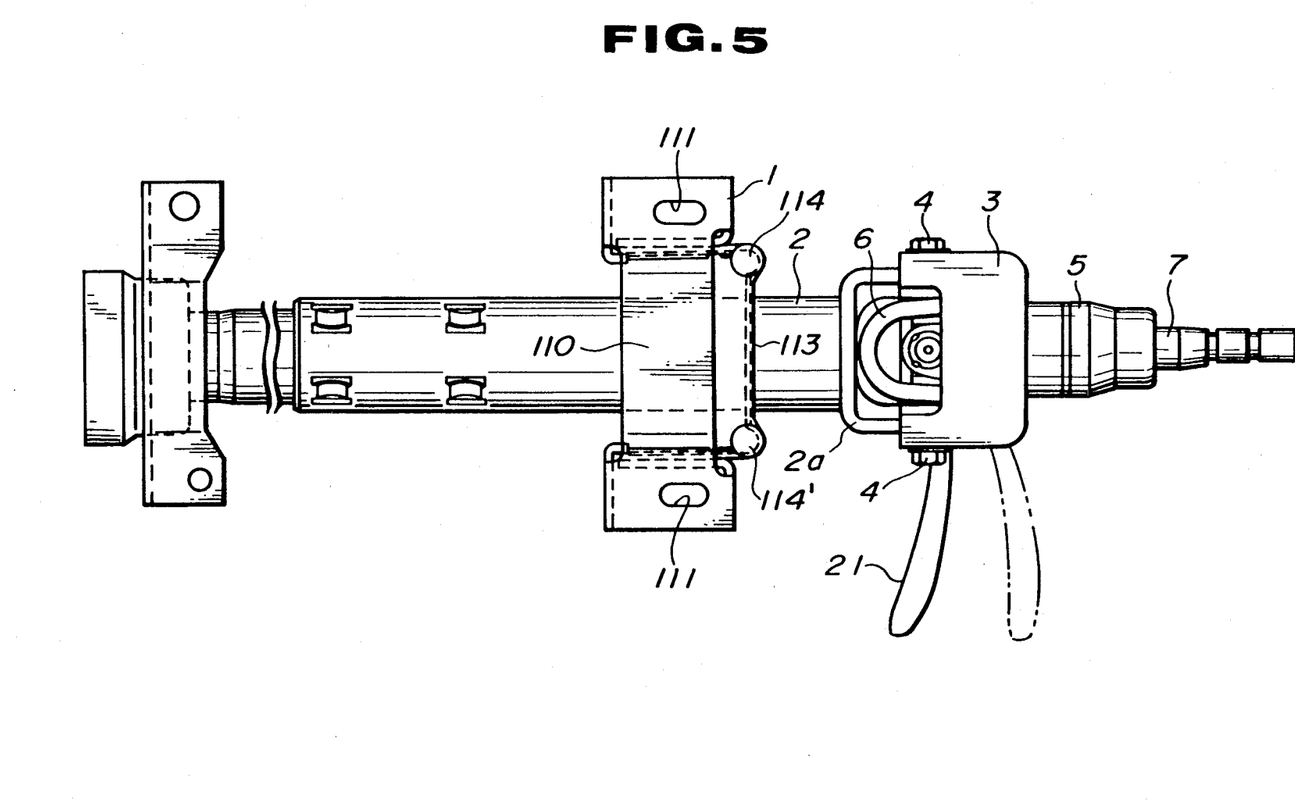
FIG. 5 is a plan view showing the tilt steering column assembly of FIG. 1.

The lower support bracket 9 has a spring receiving portion 40. In this embodiment, the spring receiving portion 40 projects outwardly from an end of the first arm of the support bracket 9. The spring receiving portion 40 has a spring receiving flat surface lying in an imaginary plane which is perpendicular to a column axis of the lower steering column 2. The spring receiving portion 40 is perpendicular to the first arm of the support bracket 9. The first and second arms and the spring receiving portion 40 of the support bracket 9 are all integral parts of a jointless single piece. A spring seat 41 is formed in the flat surface of the spring receiving portion 40. The spring seat 41 is in the form of a projection formed by embossing. The spring receiving portion 41 is loosely received in the rectangular hole 38 of the guide bracket 30. The spring receiving portion 42 of the guide bracket 30 has a spring receiving flat surface which faces toward the spring receiving surface of the spring receiving portion 40 of the support bracket 9, and which lies in a plane perpendicular to the column axis. In the spring receiving surface of the spring receiving portion 42, there is formed a spring seat 43 in the form of a projection formed by embossing. The spring 44 is disposed between the spring receiving portions 40 of the support bracket 9 and the spring receiving portion 42 of the guide bracket 30. The spring 44 of this embodiment is a coil spring having hookless ends. One end of the spring 44 is engaged with the spring seat 41, and the other spring end is engaged with the spring seat 43, as shown in FIGS. 3 and 4.

Figure 1:
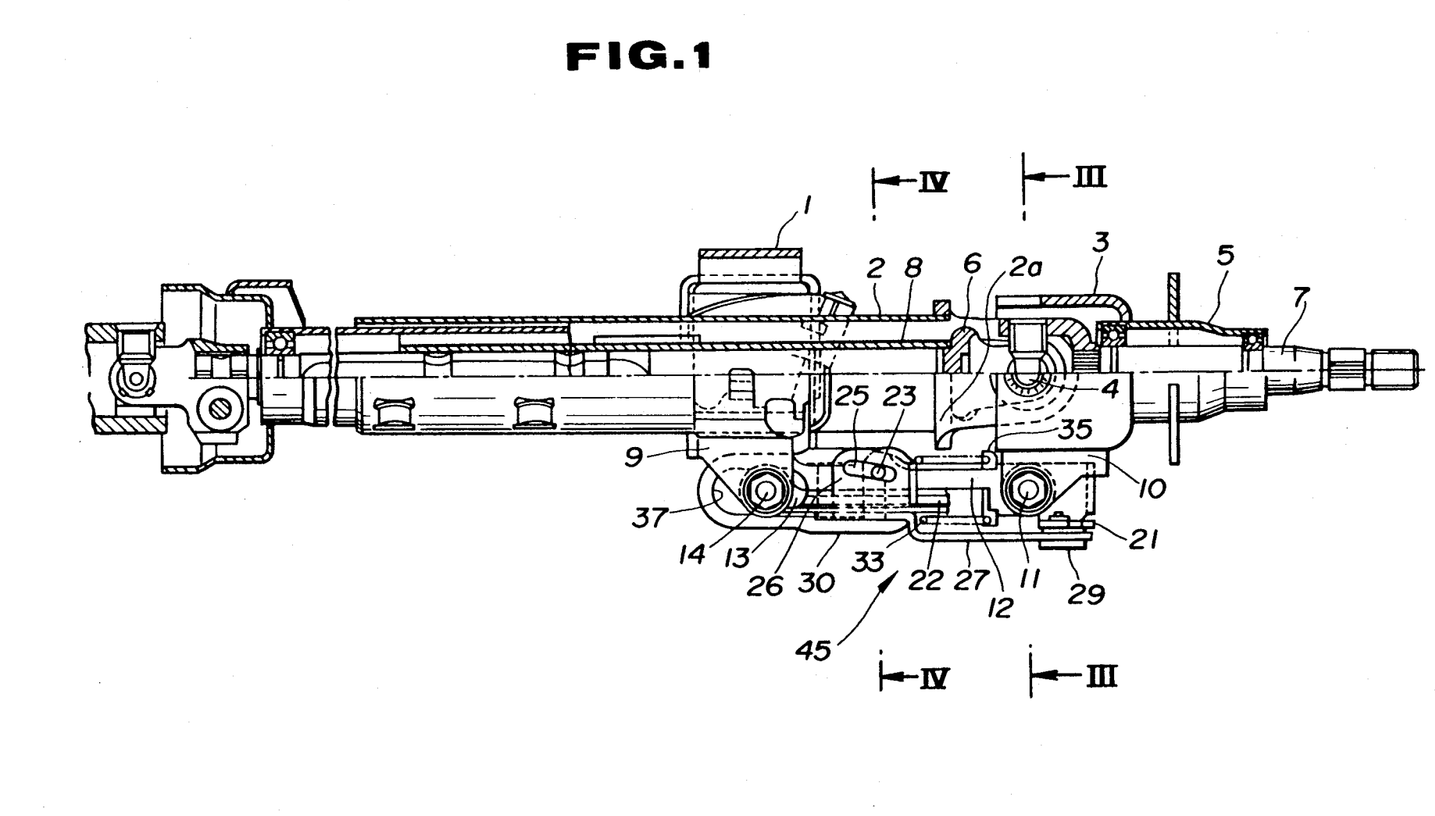
FIG. 1 is a view showing, partly in section, a tilt steering column assembly according to one embodiment of the present invention.
Figure 2:
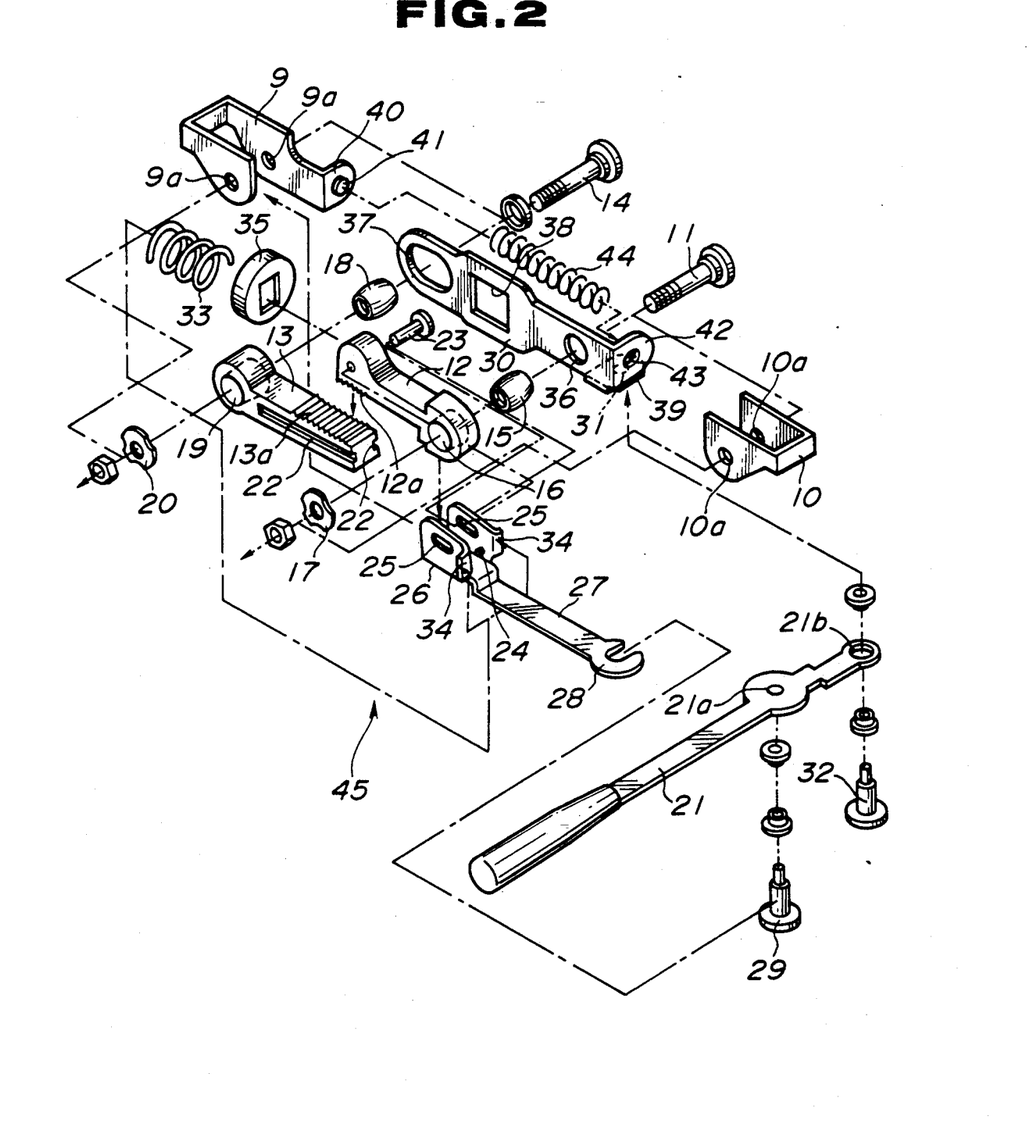
FIG. 2 is a perspective view showing various members of a tilt lock mechanism of the tilt steering column assembly of FIG. 1.

When the driver pulls the grip of the manual operating lever 21 toward himself, the manual lever 21 swings about the pin 32, and pulls the lock member 27 in the rightward direction as viewed in FIG. 1 against the force of the lock spring 33. During this rightward movement of the lock member 27, the projections 24 of the lock member 27 slides along the grooves 22 of the lower toothed member 13, and the pin 23 of the upper toothed member 12 slides along the inclined slots 25 of the lock member 27 in the uphill direction from the lower ends 25b toward the upper ends 25a which is closer to the column axis of the lower column 2 than the lower end 25b. Therefore, the toothed portion 12a of the upper toothed member 12 is slightly lifted up and disengaged from the toothed portion 13a of the lower toothed member 13.

Figure 6:
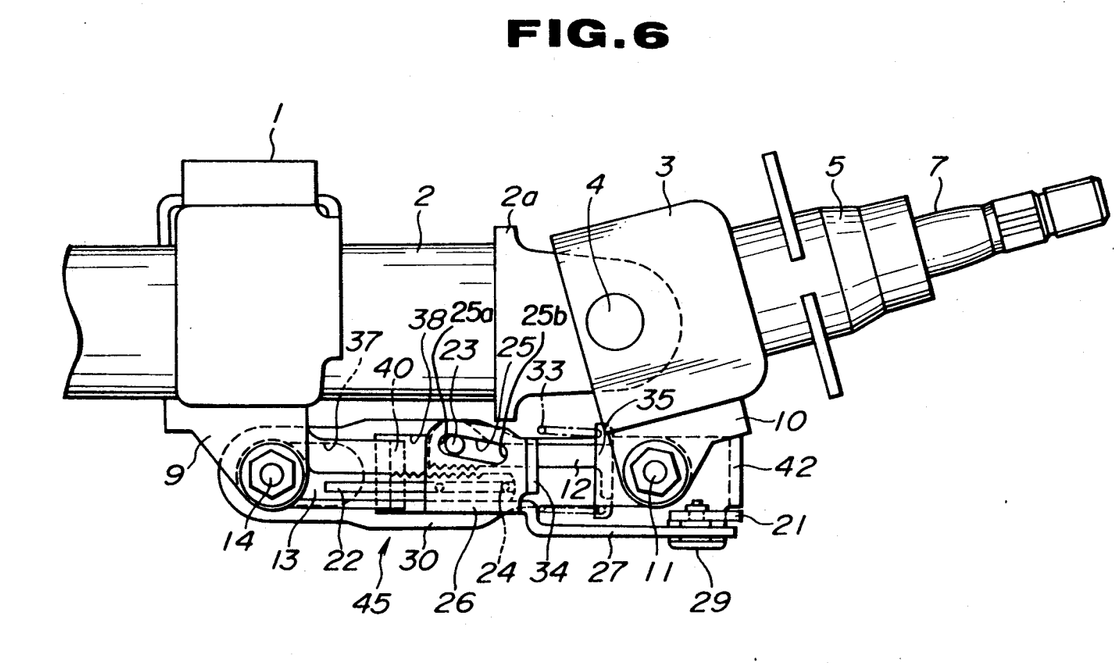
FIG. 6 is a view for showing a released state of the tilt lock mechanism shown in FIGS. 1 and 2
Figure 7:
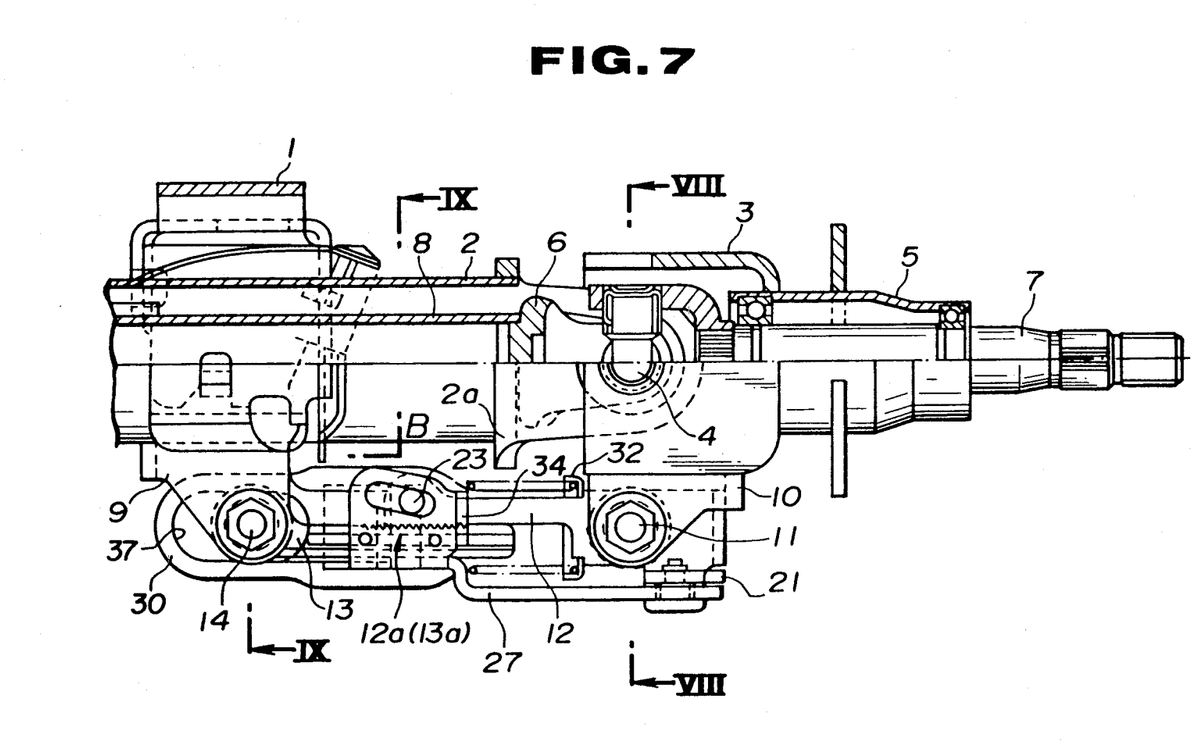
FIG. 7 is a view for showing a locked standard state of the tilt lock mechanism shown in FIGS. 1 and 2.

When the toothed portions 12a and 13a are disengaged, the force of the tilt spring 44 immediately causes the movable bracket 3 to swing about the axis of the tilt hinge 4 to the uppermost position shown in FIG. 6. In this swinging movement of the movable bracket 3, the bolt 11 of the movable support bracket 10 swings about the tilt hinge 4 together with the movable bracket 3. Since the bolt 11 is inserted through the circular hole 36 of the guide member 30, the swing movement of the bolt 11 causes the guide member 30 to move rightward as viewed in FIG. 6 substantially along a straight line. This movement of the guide member 30 is substantially a translational motion. During this movement, the elongated hole 37 of the guide member 30 moves rightward as viewed in FIG. 6, and one end of the elongated hole 37 abuts against the bolt 14 to limit the translation movement of the guide member 30 and the swing movement of the movable support bracket 10. In this way, the steering wheel mounted on the upper shaft 7 is sprung up to the uppermost position corresponding to the uppermost position of the movable bracket 3 and the upper shaft 7 shown in FIG. 6, and held at the uppermost position.

In this mechanism, the guide member 30 is designed to move translationally along the straight line which is parallel to the column axis of the lower column 2 with no or little vertical displacement. Therefore, the spring receiving portions 42 of the guide member 30 is always held in parallel to the spring receiving portion 40 of the support bracket 9, and the spring seat 43 is always held in alighment with the spring seat 41 of the support bracket 9. As a result, the tilt spring 44 can apply its biasing force effectively without being bent.

In the unlocked state of the steering assembly shown in FIG. 6, the driver can move the steering wheel to a desired angular position. When the manual lever 21 is pushed back to the original position with the steering wheel held at a desired angular position, the lock member 27 moves leftward as viewed in FIGS. 1 and 6. This movement causes the pin 23 to slide down in the inclined slots 25 toward the lower ends 25b which is closer to the lower toothed member 13 than the upper end 25a. Therefore, the upper toothed member 13 moves downwardly away from the lower column 2, and the toothed portions 12a and 13a of the upper and lower toothed members 12 and 13 are put in engagement with each other again. This engagement is maintained by the force of the lock spring 33.

Figure 11:
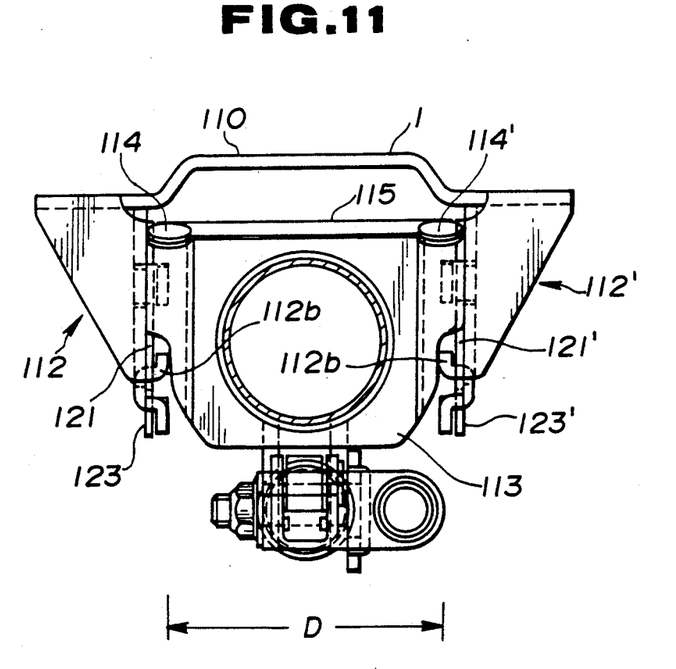
FIG. 11 is a sectional view showing a mounting bracket of the steering column assembly shown in FIGS. 1 and 2.
Figure 12:
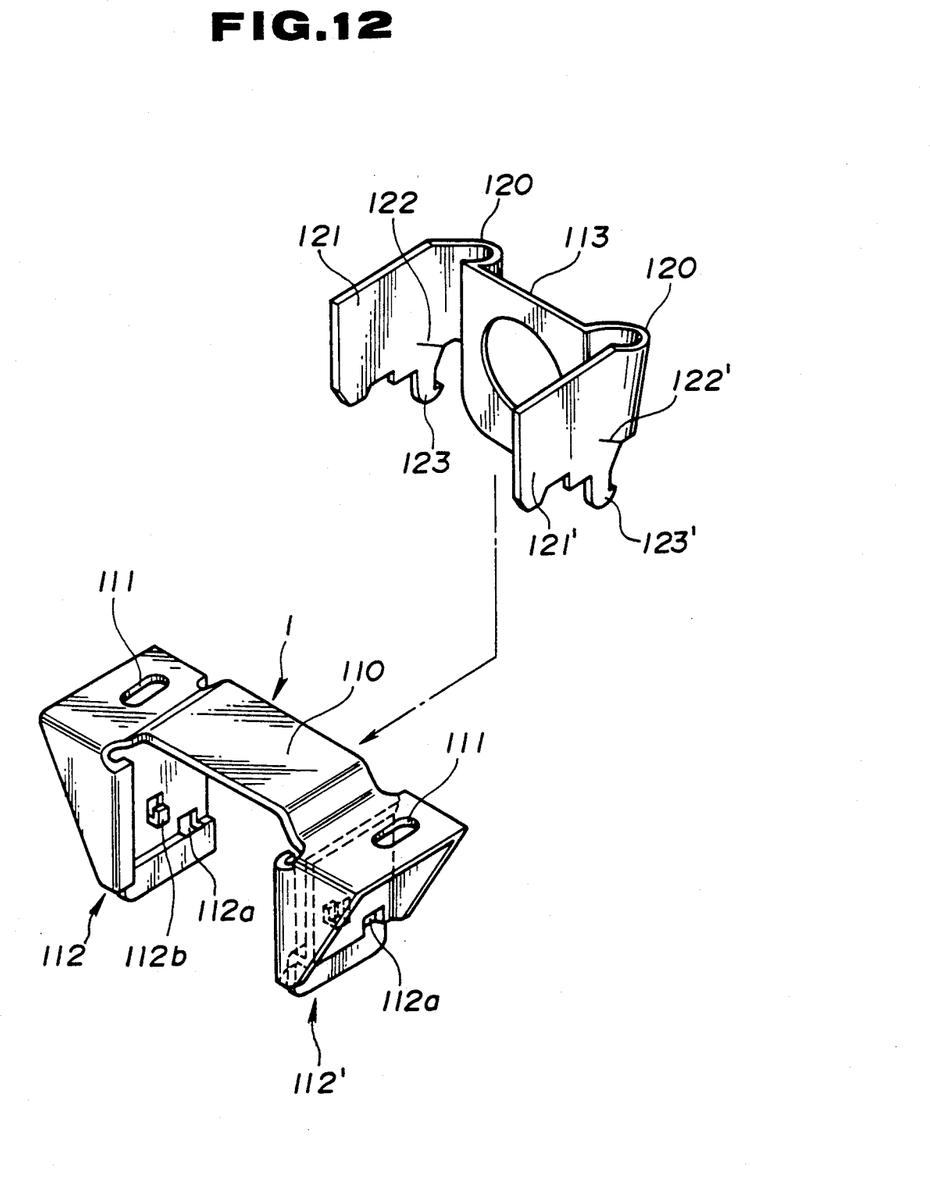
FIG. 12 is a perspective view showing the mounting bracket of FIG. 11 and an impact energy-absorbing member used in the steering column assembly of FIG. 1.
Figure 13:
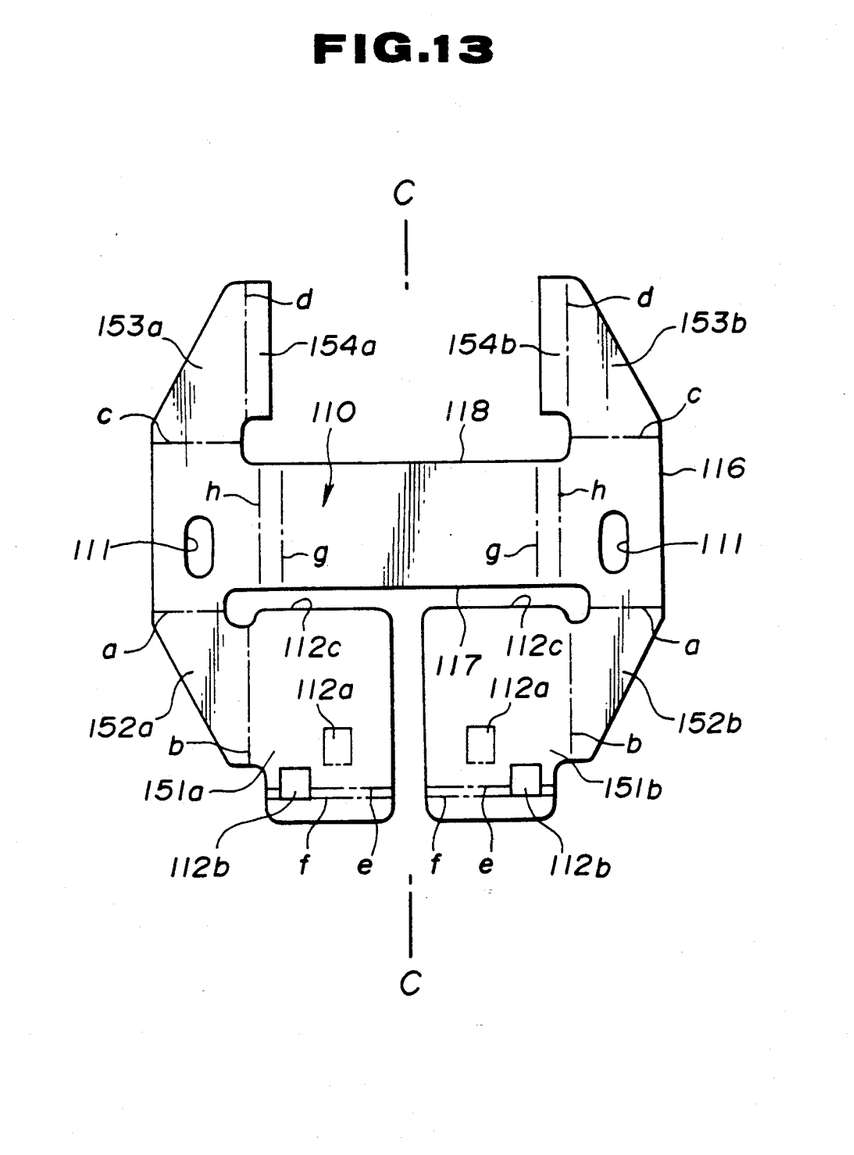
FIG. 13 is a view showing, in an developed state, the mounting bracket of the steering column assembly shown in FIGS. 1 and 2.

FIGS. 11, 12 and 13 shows the mounting bracket 1. As shown in FIG. 12, the mounting bracket 1 has an upper mounting portion (or top portion) 110 having left and right upper end portions each of which is formed with an elongated bolt hole 111 through which a fastening bolt is inserted, and left and right leg portions 112, 112'. The leg portions 112, 112' extend downwardly from the upper mounting portion 110. The leg portions 112, 112' and the upper mounting portion 110 are all integral parts of a jointless single piece, and they are shaped, as a whole, like an inverted letter U. The leg portions 112, 112' extend in parallel to each other, and they are separated from each other at a predetermined distance D as shown in FIG. 11. An impact energy absorbing member 113 is attached to the lower steering column 2, and placed between the leg portions 112 of the mounting bracket 1. The impact energy absorbing member 113 is partly connected with the leg portions 112, 112'. There are further provided rollers 114, 114' for promoting curling of the impact energy absorbing member 113, and a cover 15 for covering the impact energy absorbing member 113.

The mounting bracket 1 is formed by bending (or folding) a single metal plate such as a sheet metal. FIG. 13 shows a metal plate 116 employed in this embodiment. The metal plate 116 has a T-shaped cut-out portion 117, a U-shaped cut-out portion 118 and the above-mentioned left and right elongated bolt holes 111. These void portions 117, 118 and 111 are all formed in the metal plate 116 which has an original shape resembling a polygon. The plate 116 is shaped like an axially symmetric figure symmetric with respect to a center line C—C shown in FIG. 13. That is, the plate 116 consists of left and right halves each of which is substantially a mirror image of the other. The elongated holes 111 are elongated in parallel to the center line C—C on both sides of the center line C—C. The T-shaped cut-out portion 117 consists of a center slit and an interior transverse slit. Both slits are straight and narrow. The transverse slit extends along a line perpendicular to the center line C—C, and the imaginary center line C—C divides (or bisects) the transverse slit into left and right halves of an equal length. The center slit extends along the center line C—C, and reaches the middle of the transverse slit on the center line C—C. The center slit of the T-shaped cut portion 117 opens in one side of the polygonal plate 116, and the U-shaped cut-out portion 118 opens in the opposite side of the plate 116. The T-shaped cut portion 117 and the U-shaped cut portion 118 are separated by the mounting portion 110 extending along a line perpendicular to the center line C—C. The elongated holes 111 are formed, respectively, in the left and right end portions of the mounting portion 110.

The leg portions 112, 112' shown in FIG. 12 are formed by bending triangular side portions 152a and 152b of the plate 116 downwardly along a line "a" perpendicular to the center line C—C, further bending rectangular lower portions 151a and 151b inwardly along two parallel lines "b" parallel to the center line C—C, further bending side portions 153a and 153b downwardly along a line "c" perpendicular to the center line C—C, and further bending marginal portions 154a and 154b along lines "d" parallel to the center line C—C. After the forming operation, the rectangular portions 151a and 151b are parallel and face to face with each other, as shown in FIG. 12. In the assembled state, the lower column 2 is disposed between the rectangular lower portions 151a and 151b. The triangular side portions 152a and 152b face toward the steering wheel, and the triangular side portions 153a and 153b face toward the lower end of the steering column 2. Each side portion serves like a gusset or a brace for reinforcing a corner of a structure. Each rectangular portion 151a or 151b is further bent along two parallel lines "e" and "f" so as to form a step. As shown in FIG. 12, each rectangular portion 151a or 151b has upper and lower flat portions separated by the step. The upper flat portions of the rectangular portions 151a and 151b are wider apart from each other. The steps are so formed that the distance between the parallel lower flat portions of the rectangular portions 151a and 151b is smaller than the distance between the parallel upper flat portions. The mounting portion 110 is bent along lines "g" and "h" on both sides of the center line C—C as shown in FIG. 13. Therefore, as shown in FIG. 12, the mounting portion consists of a raised flat middle portion and the left and right depressed flat end portions. It is possible to further improve the rigidity of the mounting bracket 1 by welding the upper ends 112c of the rectangular portions 151a and 151b to the underside of the mounting portion 110. The completed bracket 1 is substantially symmetrical so that the mounting bracket 1 can be divided by an imaginary median plane into two substantially equal right and left halves like a figure having a bilateral symmetry.

Each of the rectangular portion 151a and 151b is further formed with an inwardly projecting hook portion 112a and a rectangular hole 112b formed in the step and the upper portion of the rectangular portion 151a or 151b. The mounting bracket 1 is fixed to the vehicle body by the fastening bolts through the elongated bolt holes 111. For example, the mounting bracket 1 is fixed to the underside of an instrument panel.

The impact energy absorbing member 113 has a central portion which is perpendicular to the axis of the lower column 2, left and right curling portions 120 and left and right arm portions 121. The central portion has a circular hole for receiving the lower column 2. The curling portions 120 are formed on both sides of the central portion, and shaped like a semicylinder. The arm portions 121 are parallel to each other. These portions are all integral parts of a jointless single piece. In this example, the impact energy absorbing member 113 is formed by bending a sheet metal. There are further formed left and right ripping portions 122, 122' in the form of a sharp cut-like crevice. Each ripping portion 122, 122' extends obliquely between the left or right curling portion 120 and the left or right arm portion 121 from the lower end of the curling portion 120. Each arm portion 121, 121' has a claw portion 123, 123' projecting downwardly from the lower end thereof. The arm portions 121, 121' are inserted between the rectangular portions, 151a and 151b of the fixed bracket 1. The claw portions 123, 123' become engaged in the holes 112a. The lower end of the arm portions 121 of the absorbing member 113 are caught and supported by the hook portions 112b of the fixed bracket 1. The arm portions 121, 121' of the energy absorbing member 113 are fixed to the leg portions 112, 112' of the fixed bracket 1 by spot welding.

In case of a head on collision of the vehicle, a secondary collison between the driver and the steering wheel causes an impact load which is transmitted through the upper shaft 7, the upper column 5 and the movable bracket 3, to the lower column 2. Therefore, the lower column 2 downwardly pushes the impact energy absorbing member 13 engaged with the mounting bracket 1. By this downward pushing force, the curling portions 120 each having the roller 114 therein curl along the inner surface of the leg portion 112, and the ripping portions 122, 122' crack open. The impact energy is thus absorbed. It is possible to use the mounting bracket 1 of the invention for rigid steering columns which are not tiltable.

In the tilt lock mechanism of this embodiment of the present invention, the toothed members overlap each other in a wide area, and the teeth in the overlapped portions are all engaged, so that the engagement is strong, secure and free from looseness.

The tilt spring is disposed between the upper and lower columns. The tilt spring of this embodiment has simple spring ends which requires no special forming operation. The arrangement for supporting the tilt spring is very compact and efficient.

The linkage of the lock member, the operating lever and the guide member is so designed that the lock member moves along the lower column. The lock member and guide member are arranged to hold and guide the toothed members so that the toothed members remains parallel to the column axis.

The arrangement for swingably supporting each toothed member is effective for preventing wrong engagement between the toothed members. The combination of the barrel-shaped collar, the conical hole and the waver washer functions to adjust the relative positions of the toothed members, and ensure the complete engagement. The tilt lock mechanism of this embodiment can improve the safety of the vehicle by preventing an accidental release of the tilt lock.

What is claimed is:

1. A tilt steering column assembly comprising:
   a column subassembly comprising upper and lower columns which are connected with each other so that said upper column is swingable about a tilt axis; and
   a tilt lock mechanism for allowing said upper column to swing when said tilt lock mechanism is in an unlocked state, and preventing said upper column from swinging when said tilt lock mechanism is in a locked state, said tilt lock mechanism comprising a first toothed member which is swingably supported by said upper column, and a second toothed member which is swingably supported by said lower column, each of said first and second toothed members being bar shaped, said first and second toothed members being engaged with each other when said tilt lock mechanism is in said locked state, and being disengaged from each other when said tilt lock mechanism is in said unlocked state.

2. A tilt steering column assembly according to claim 1 wherein each of said first and second toothed members extends substantially along an axis of said lower column, and comprises teeth which are arranged in a substantially flat plane.

3. A tilt steering column assembly according to claim 2 wherein said first toothed member comprises a base end portion which is pivotally supported by said upper column so that said first toothed member is swingable on a first swing axis, said second toothed member comprises a base end portion which is pivotally supported by said upper column so that said second toothed member is swingable on a second swing axis, said first toothed member further comprises a swingable toothed portion comprising a bottom face which faces downwardly and which is formed with teeth spaced from one another along a straight line, and said second toothed member further comprises a swingable toothed portion which is located under said toothed portion of said first toothed member and which comprises a top face facing upwardly toward said bottom face of said first toothed member and having teeth that are spaced from one another along a straight line.

4. A tilt steering column assembly according to claim 3 wherein said lock mechanism further comprises a lock member for disengaging said toothed portions of said first and second toothed members from each other when said lock member is moved in a first direction parallel to an axis of said lower column, and engaging said toothed portions of said toothed members with each other when said lock member is moved in a second direction opposite to said first direction.

5. A tilt steering column assembly according to claim 4 wherein said column assembly further comprises a tilt spring which is disposed between said lower and upper columns and which tends to cause said upper column to swing about said tilt axis in an upward direction, and wherein both of said tilt lock mechanism and said tilt spring are located under said column subassembly near said tilt axis.

6. A tilt steering column assembly according to claim 5 wherein said second toothed member is formed with a straight guide groove which extends along a straight line which is substantially perpendicular to said second swing axis, said lock member is formed with an inclined slot and an inward projection which is slidably received in said guide groove of said second toothed member, and said first toothed member comprises an outward projection which is slidably received in said inclined slot of said lock member.

7. A tilt steering column assembly according to claim 5 wherein said tilt lock mechanism further comprises a guide member having a first end pivotally supported by said upper column, and a second end which is formed with an elongated hole and which is connected through said elongated hole with said lower column so that said guide member can move along an axis of said lower column.

8. A tilt steering column assembly according to claim 7 wherein said tilt spring is disposed under compression between said lower column and said guide member.

9. A tilt steering column assembly according to claim 8 wherein said lock mechanism further comprises a lower support bracket which is fixed to said lower column, and said tilt spring is a coil spring and disposed between a lower spring seat which is formed in said lower support bracket and an upper spring seat which is formed in said guide member, said lower and upper spring seats of said lower support bracket and said guide member being arranged substantially in a straight line parallel to said axis of said lower column so that an axis of said tilt spring is held substantially in parallel to said axis of said lower column.

10. A tilt steering column assembly according to claim 9 wherein said second toothed member is formed with left and right straight guide grooves which extend along a straight line which is substantially perpendicular to said second swing axis, said lock member is formed with left and right inclined slots and left and right inward projections which are slidably received in said guide grooves of said second toothed member, and said first toothed member comprises outward projections which are slidably received in said inclined slots of said lock member.

11. A tilt steering column assembly according to claim 10 wherein said base end portion of one of said first and second toothed member is formed with a conical hole having an inside surface which is a curved surface of a truncated cone, and swingably supported through a barrel-shaped collar which is confined in said conical hole.

12. A tilt steering column assembly according to claim 10 wherein said first toothed member comprises a guide pin and a conical hole formed in said base end portion of said first toothed member, and said second toothed member comprises a conical hole, said conical hole of each of said first and second toothed members having an inside surface which is a curved surface of a truncated right circular cone, and wherein said lock mechanism further comprises a first barrel-shaped collar received in said conical hole of said first toothed member, and a second barrel-shaped collar received in said conical hole of said second toothed member, said first toothed member being pivotally supported through said first barrel-shaped collar on said upper column, said second toothed member being pivotally supported through said second barrel-shaped collar on said lower column.

13. A tilt steering column assembly according to claim 12 wherein said lock mechanism further comprises an upper support bracket which is fixed to an underside of said upper column, and which comprises first and second arms between which said base end portion of said first toothed member is placed, said lower support bracket being fixed to an underside of said lower column and comprising first and second arms between which said base end portion of said second toothed member is placed, and wherein said first toothed member is swingably supported by a first bolt which is inserted through a center bore formed in said first barrel-shaped collar and through said conical hole of said first toothed member and which is supported by said first and second arms of said upper support bracket, and said second toothed member is swingably supported by a second bolt which is inserted through a center bore formed in said second barrel-shaped collar and through said conical hole of said second toothed member and which is supported by said first and second arms of said lower support bracket.

14. A tilt steering column assembly according to claim 13 wherein said second bolt is inserted through said elongated hole of said guide member, and said first bolt is inserted thorough a hole formed in said first end of said guide member so that an axis of said first bolt is held substantially stationary relative to said guide member.

15. A tilt steering column assembly according to claim 14 wherein said lock mechanism further comprises a first wave washer for pushing one of said first barrel-shaped collar and said first toothed member against the other, and a second wave washer for pushing one of said second barrel-shaped collar and said second toothed member against the other, said first wave washer being mounted on said first bolt between said first and second arms of said upper support bracket, and said second wave washer being mounted on said second bolt between said first and second arms of said lower support bracket.

16. A tilt steering column assembly according to claim 15 wherein said tilt lock mechanism further comprises an operating lever comprises a swingable end portion, a base end portion pivotally supported by said first end of said guide member, and an intermediate portion which is located between said swingable end portion and said base end portion of said operating lever and which is pivotally connected with said lock member.

17. A tilt steering column assembly according to claim 16 wherein said guide member comprises a rectangular hole formed between said first and second ends, and said lower support bracket comprises a spring receiving portion which is formed with said lower spring seat, and which is loosely received in said rectangular hole of said guide member.

18. A tilt steering column assembly according to claim 17 wherein said teeth of said first toothed member are all straight and substantially parallel to said axis of said conical hole of said first toothed member, and said teeth of said second toothed member are all straight and substantially parallel to said axis of said conical hole of said second toothed member, wherein said operating lever is swingable about a lever axis which extends substantially along a line perpendicular to said axis of said lower column, wherein said tilt lock mechanism further comprises a lock spring for holding said first and second toothed members engaged with each other, said lock spring being disposed between said lock member and said first toothed member, and wherein said lock member comprises first and second upright wall portions which are flat and parallel to each other, and a flat bottom portion which extends between said first and second upright wall portions and which is substantially perpendicular to said first and second upright wall portions, said first and second toothed members being placed between said first and second upright wall portions of said lock member, said inclined slots of said lock member being formed, respectively, in said first and second upright wall portions, each of said inclined slot extending along a straight line which is inclined with respect to said flat bottom portion, said first toothed member being linked with said lock member through said pin received in said inclined slots so that a rectilinear motion of said lock lever causes a swing motion of said first toothed member.

19. A tilt steering column assembly according to claim 18 wherein said column subassembly comprises a mounting bracket for supporting said lower column, said mounting bracket comprising an upper portion, left and right first side portions and left and right lower portions which extend downwardly under said upper portion, said lower column being disposed between said left and right lower portions under said upper portion, said mounting bracket being a jointless single metal piece in the form of a shaped metal sheet, and said upper portion, side portions and lower portions of said mounting bracket being all integral parts of said single metal piece, each of said left and right side portions extending downwardly from said upper portion, said left lower portion extending from said right side portion.

20. A tilt steering column assembly according to claim 19 wherein said upper portion of said mounting bracket comprises left and right flat end portions and a middle portion lying between said left and right flat end portions, said left first side portion being flat and perpendicular to said left end portion and extending downwardly from a first side of said left end portion, said right side portion being flat and perpendicular to said right end portion and extending downwardly from a first side of said right end portion, said left lower portion being flat and perpendicular to said left side portion, said right lower portion being flat and perpendicular to said right side portion.

21. A tilt steering column assembly according to claim 20 wherein said mounting bracket comprises a first edge formed between said left end portion and said left side portion, a second edge formed between said right end portion and said right side portion, a third edge formed between said left side portion and said left lower portion and a fourth edge formed between said right side portion and said right lower portion, said first and second edges extending along a horizontal straight line and being aligned, each of said third and fourth edges extending downwardly along a line perpendicular to said horizontal straight line.

22. A tilt steering column assembly according to claim 21 wherein said mounting bracket comprises left and right elongated holes which are formed, respectively, in said left and right end portions and which extend along said axis of said lower column.

23. A tilt steering column assembly according to claim 22 wherein said mounting bracket further comprises left and right second side portions extending downwardly, respectively, from second sides of said left and right end portions, and wherein said mounting bracket is symmetrical so that said mounting bracket can be divided by an imaginary median plane into left and right halves each of which is substantially a mirror image of the other.

24. A tilt steering column assembly according to claim 20 wherein said mounting bracket is formed by bending an original thin metal plate which is flat and symmetrical with respect to a center line, and which comprises a U-shaped cut portion and a T-shaped cut portion each of which is symmetrical with respect to said center line.

25. A tilt steering column assembly for a vehicle, said assembly comprising:
a column subassembly comprising upper and lower columns, and a means for connecting said upper and lower columns so that said upper column is swingable about a tilt axis; and
a tilt lock mechanism for locking said column subassembly, said tilt lock mechanism comprising:
upper and lower toothed members one of which is swingably supported by said upper column and the other of which is swingably supported by said lower column, said tilt lock mechanism further comprising:
a support shaft,
a barrel-shaped collar which is mounted on said support shaft and which is received in a conical hole formed in one of said upper and lower toothed members so that the one of said first and second toothed members which is formed with said conical hole, is pivotally supported by said barrel-shaped collar, and
biasing means for biasing one of said barrel-shaped collar and the one of said first and second toothed members which is formed with said conical hole, toward the other.

26. A tilt steering column assembly for a vehicle, said assembly comprising:
a column subassembly comprising upper and lower columns, and a means for connecting said upper and lower columns so that said upper column is swingable about a tilt axis;
a lower support bracket which is fixed to an underside of said lower column;
a lower spring receiving portion which comprises part of said lower support bracket and which is substantially flat and perpendicular to an axis of said lower column;
a guide member extending under said upper and lower columns along a straight longitudinal line which is substantially parallel to said axis of said lower column;
a first end portion which forms part of said guide member and which is pivotally supported by said upper column;
an upper spring receiving portion which forms part of said first end portion and which is perpendicular to said longitudinal line;
a second end portion which forms part of said guide member, which is formed with an elongated hole and which is connected with said lower column so that said guide member is swingable relative to said lower column and movable relative to said lower column along said longitudinal line; and
a compression type tilt spring disposed under compression between said lower and upper spring receiving portions for urging said upper column to swing upwardly.

27. A mounting bracket for supporting a steering column, said mounting bracket comprising:

an upper portion, left and right first side portions and left and right lower portions which extend downwardly under said upper portion, and said upper portion, side portions and lower portions of said mounting bracket being all integral parts of a jointless single metal piece, each of said left and right side portions extending downwardly from said upper portion, said left lower portion extending from said left side portion, and said right lower portion extending from said right side portion, said mounting bracket being a formed sheet of metal having a figure which can be developed into a planar figure having a U-shaped cut-out portion extending from a first side of said planar figure along a center line, a transverse slit extending along a line perpendicular to said center line, and a center slit which extends from a second side of said planar figure along said center line, said center slit reaching a middle portion of said transverse slit to define an essentially T-shaped cut-out portion.

28. A mounting bracket according to claim 27 wherein said mounting bracket is a formed sheet metal having a figure which can be developed into a planar figure having a U-shaped cut portion extending from a fist side of said planar figure along a center line, a transverse slit extending along a line perpendicular to said center line, and a center slit which extends from a second side of said planar figure along said center line, and which reaches a middle of said transverse slit.

29. A mounting bracket according to claim 27 wherein said upper portion comprises left and right flat end portions, said left side portion is flat, triangular and perpendicular to said left flat end portion, said right side portion is flat, triangular and perpendicular to said right flat end portion, said left lower portion is flat, rectangular and perpendicular to said left side portion, and said right lower portion is flat, rectangular and perpendicular to said right side portion.

30. A mounting bracket for supporting a steering column, said mounting bracket comprising:
an upper portion, left and right first side portions and left and right lower portions which extend downwardly under said upper portion, and said upper portion, side portions and lower portions of said mounting bracket being all integral parts of a jointless single metal piece, each of said left and right side portions extending downwardly from said upper portion, said left lower portion extending from said left side portion, and said right lower portion extending from said right side portion said mounting bracket being formed of a single sheet of metal having a figure which can be developed into a planar essentially H-shaped figure having an open U-shaped cut-out portion formed in a top edge of said planar figure, a transverse slit which extends to locations proximate the side edges of said figure, respectively, and a center slit which extends from a bottom edge of said planar figure and merges with essentially the mid portion of said transverse slit to define an essentially T-shaped cut-out portion which is discrete from said U-shaped cut-out portion.

* * * * *